(No Model.) 2 Sheets—Sheet 1.
L. LAWTON.
KILN FOR FIRING POTTERY, &c.
No. 524,390. Patented Aug. 14, 1894.
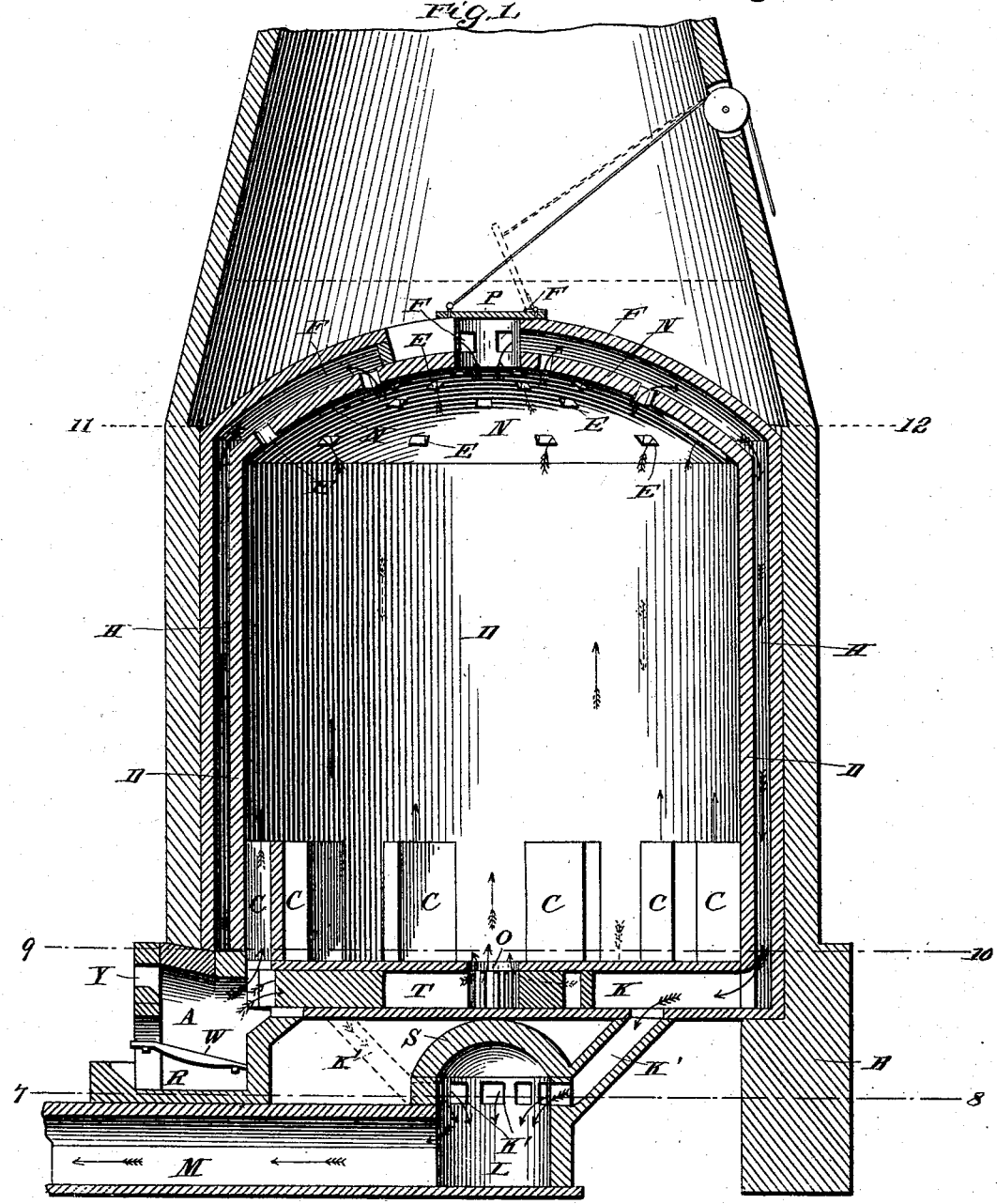
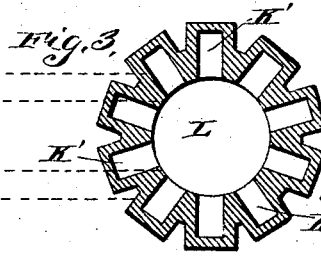
Witnesses:
Aly Scott
Jas. W. Ingham
Inventor:
Lewis Lawton
by Pennie & Goldsborough
Attys (No Model.) 2 Sheets—Sheet 2.

L. LAWTON.
KILN FOR FIRING POTTERY, &c.

No. 524,390. Patented Aug. 14, 1894.

Witnesses:
Inventor:
Lewis Lawton,

UNITED STATES PATENT OFFICE.

LEWIS LAWTON, OF TRENTON, NEW JERSEY.

KILN FOR FIRING POTTERY, &c.

SPECIFICATION forming part of Letters Patent No. 524,390, dated August 14, 1894.

Application filed December 3, 1891. Renewed March 5, 1894. Serial No. 502,439. (No model.)

*To all whom it may concern:*

Be it known that I, LEWIS LAWTON, a citizen of the United States, residing at Trenton, in the county of Mercer, in the State of New Jersey, have invented certain new and useful Improvements in Kilns for Firing Pottery and other Manufactures of Clay, of which the following is a specification.

The object of my invention is to provide in a down draft kiln a novel construction of flues so combined as to produce a practically uniform degree of heat throughout the entire firing chamber which contains the ware to be fired, and to produce this effect with a great economy of fuel.

I shall now proceed to fully describe my invention with reference to the accompanying drawings, in which—

Figure 2:
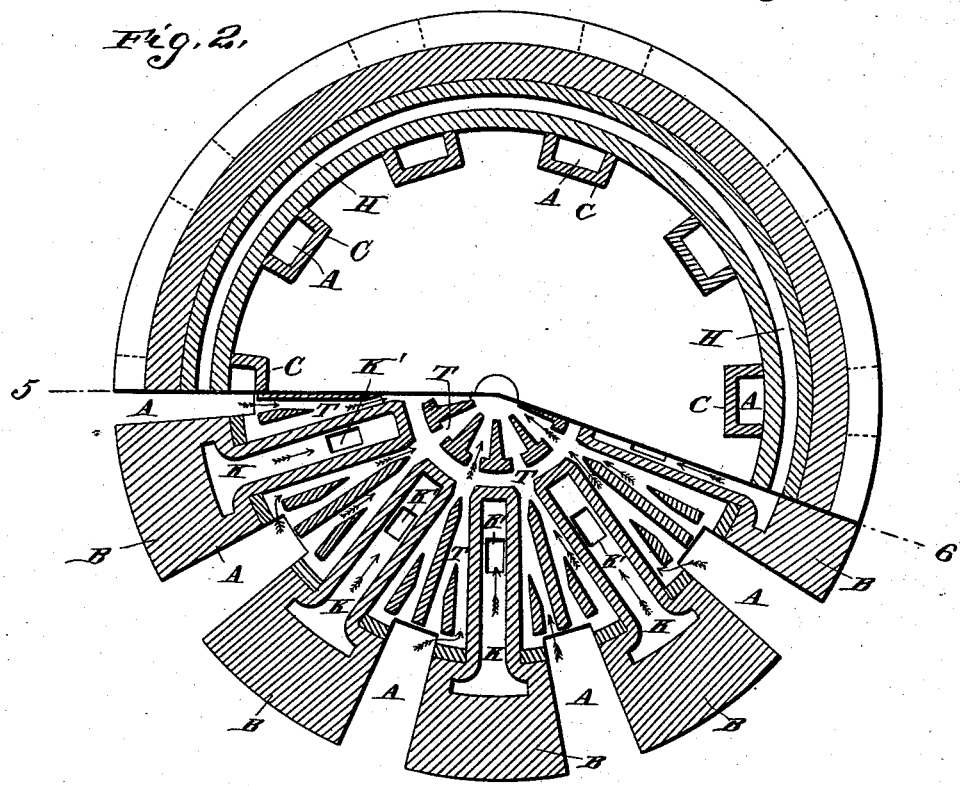
Figure 4:
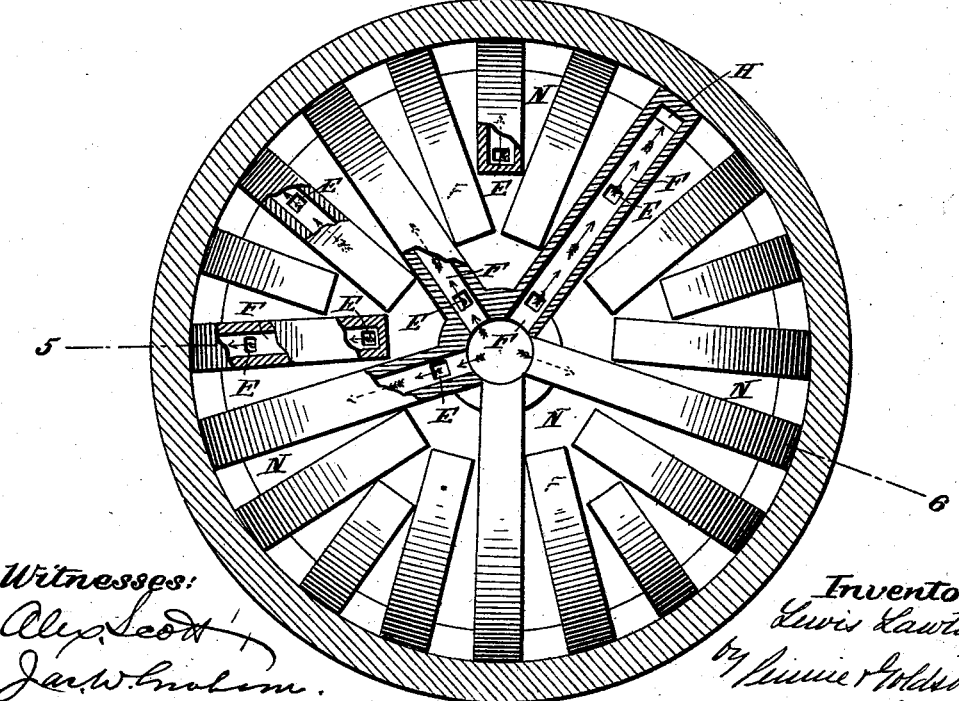

Figure 1 shows a vertical section of the kiln on the broken line 5—6 in Figs. 2 and 4, and also shows in perspective sufficient of the inner construction of the kiln to insure clearness. Fig. 2 is a plan view of the kiln below the line 9—10 in Fig. 1, with a portion of the floor of the kiln-chamber removed to show the construction and arrangement of flues beneath the same. Fig. 3 is a plan view in section of the central draft chamber, taken on the line 7—8 of Fig. 1; and Fig. 4 is a plan view of the crown or dome of the kiln taken below the line 11—12 in Fig. 1, showing the arrangement of flues on the crown with portions of the flue coverings removed to show the internal construction of those flues.

In the drawings like letters indicate like parts.

A indicates the fire boxes; B, the foundation piers or divisions between the fire boxes; C the fire bag; D the inner lining of the kiln; E outlets or perforations through the crown of the kiln connecting with flues F on the crown.

H is an annular flue encircling the kiln-chamber, and extending from a point a little above the level of the floor of the kiln to the spring of the crown.

K are flues leading from the foot of the annular flue H to the branch flues K'.

L is the central draft chamber.

M is the flue leading from the central draft chamber to a stack or chimney not shown in the drawings, but which is of ordinary construction, and placed at a convenient distance from the kiln, and arranged to convey the products of combustion from the kiln and pass them into the outer air.

N is the crown or dome of the kiln.

O is a well hole or opening through the floor of the kiln through which the heat and other products of combustion are conveyed from the furnaces into the center of the kiln; the heat and other products of combustion passing into said well hole or opening O from the furnaces through the flues T.

F is a damper or valve which is opened to allow the kiln and contents to cool when the firing is completed.

R indicates the ash pits, of which but one is shown.

S indicates the arched roof of the central draft chamber.

W indicates the grate bars; and Y indicates one of the openings for supplying fuel to the furnaces.

The courses of the heat currents are indicated by arrows which point with the currents.

In use the kiln is thus operated: Fires are set in the several furnaces A, and the damper F in the crown of the kiln is opened and kept open for a sufficient time to furnish proper draft for a thorough kindling of the fire, when it is closed. A portion of the heat and products of combustion passes from the furnaces through the flues T to the well hole or opening O in the center of the floor of the kiln, and through the well hole into the kiln chamber, while another portion of the heat and products of combustion passes into the chamber through the several fire bags C which are arranged in a circle against the inner wall of the kiln, thus diffusing heat rapidly and evenly throughout the body of the kiln. From the kiln chamber, the heat and products of combustion pass through the openings E in the crown or dome of the kiln into the flues F thereon, and through these flues F into the annular flue H, and down through the annular flue into the several flues K beneath the floor of the kiln, through the flues K into the flues K', and thence into the central draft chamber, and thence through the main outlet flue M, through which they pass into the stack or chimney, and thence into the outer air.

In order to preserve as even a temperature as possible throughout the kiln chamber, and prevent the heat taking a lead through any particular flues, the outlets E and flues F in the crown of the kiln are so proportioned and arranged that the larger openings E and flues F are placed nearest to and radiate from the central part of the crown N. This prevents the tendency of the heat to pass to any side of the kiln, which is a desideratum. This effect is further contributed to by the even heating of the crown of the kiln due to the passing of the heat through the flues F to points evenly spaced along the circumference of the crown whence the heat passes down into the annular flue H and produces an even degree of heat on all sides of the kiln chamber. An even draft at all points at the foot of the annular flue H is effected by the introduction of the central draft chamber L and the flues K and K'. By the introduction of these features, the degree of heat throughout the annular flue H is maintained evenly, and to great advantage, as will be easily understood. Were the draft chamber L to be located at one side of the kiln, or were any arrangement made by which the products of combustion were not centrally collected beneath the kiln, there would be a strong tendency to an uneven heating of the sides and floor of the kiln. In kilns of ordinary construction this difficulty is commonly experienced and especially in windy weather.

It will be observed, of course, that the flues F on the crown of the kiln might be dispensed with and a double crown constructed into which the heat from the kiln-chamber might be passed through graduated openings E, and I do not desire to be restricted to the use of the flues F; but I have shown what I consider to be the better construction, as even though the openings E should be made larger near the center of the crown, if the flues F were dispensed with there would be a tendency in the heat to pass unevenly through the double crown and annular flue H, which tendency is overcome by the use of the flues F. It will also be apparent that the form of the kiln may be varied. In its plan it may be square, polygonal, or of other form, and one or several furnaces may be employed, but I have deemed it sufficient to show my construction as applied to a down draft kiln of the common circular form. I do not, therefore, wish to be limited to the specific construction shown; but

What I claim as new, and desire to secure by Letters Patent, is—

1. In a kiln, one or more furnaces in combination with flues leading from said furnaces to the bottom of a firing chamber, a firing chamber having a perforated crown, the openings near the center of the crown being larger than those near its edge, radial flues leading from said graduated openings to the sides of the kiln, an annular flue surrounding the firing chamber on all sides and communicating with said radial flues, flues leading from the annular flue and converging at the center and communicating with a central draft chamber beneath the firing chamber, the central draft chamber, and an outlet flue leading from the central draft chamber to a stack, substantially as described.

2. In a kiln one or more furnaces in combination with flues leading from said furnaces to the bottom of a firing chamber, a firing chamber having a perforated crown, the openings near the center of the crown being larger than those near its edge, graduated radial flues leading from said graduated openings to the sides of the kiln, an annular flue surrounding the fire chamber on all sides and communicating with said radial flues, radial flues leading from the bottom of the annular flue and converging under the center of the firing chamber and communicating with a central draft chamber beneath the firing chamber, the central draft chamber, and an outlet flue leading from the central draft chamber to a stack, substantially as described.

3. In a kiln, one or more furnaces in combination with flues leading from said furnaces to the center and sides of the floor of a firing chamber, a firing chamber having a crown provided with graduated openings, those near the center of the crown being larger than those near its edge, a flue or flues leading from said openings to an annular flue surrounding the firing chamber on all sides, flues leading from the foot of the annular flue and converging beneath the center of the floor of the firing chamber, and an outlet flue leading to a stack, substantially as described.

4. In a kiln, the combination with a series of furnaces, of a firing chamber having a central opening in its floor and a series of fire bags arranged around its side, flues leading from said furnaces to said central opening and fire bags, a crown at the top of the firing chamber provided with a series of graduated openings, those near its center being larger than those near its edges, a central valved opening in the crown, graduated flues leading from said graduated openings in the crown to an annular flue surrounding the firing chamber on all sides, radial flues leading from the foot of the annular flue and converging beneath the center of the floor of the firing chamber where they communicate with a central draft chamber provided with an outlet flue leading to a stack, substantially as shown and described.

LEWIS LAWTON.

Witnesses:
H. F. BAKER,
JOS. L. WATSON.